(12) United States Patent
Keaton et al.

(10) Patent No.: US 6,481,647 B1
(45) Date of Patent: Nov. 19, 2002

(54) SEED METER AND ACCELERATOR

(75) Inventors: Miles Raymond Keaton, Rock Island; David James Rylander, Victoria, both of IL (US)

(73) Assignee: Deere & Company, Moline, IL (US)

( * ) Notice: Subject to any disclaimer, the term of this patent is extended or adjusted under 35 U.S.C. 154(b) by 11 days.

(21) Appl. No.: 09/632,182

(22) Filed: Aug. 3, 2000

(51) Int. Cl.$^7$ ............................................. A01C 15/04
(52) U.S. Cl. ...................... 239/654; 239/668; 239/679; 239/684
(58) Field of Search ................... 239/654, 656, 239/668, 674, 676, 679, 681–685, 687, 100; 222/410; 111/185, 184, 179; 221/211

(56) References Cited

U.S. PATENT DOCUMENTS

| | | | |
|---|---|---|---|
| 2,783,918 A | * 3/1957 | Bramlett | 222/410 |
| 2,995,274 A | * 8/1961 | Haun et al. | 221/211 |
| 3,347,426 A | 10/1967 | Morrison, Jr. et al. | |
| 3,348,504 A | * 10/1967 | Fischer | 111/185 |
| 3,387,746 A | * 6/1968 | Whipple | 221/211 |
| 3,731,842 A | 5/1973 | Schlegel | |
| 3,773,224 A | * 11/1973 | Winslow | 111/185 |
| 6,173,664 B1 | 1/2001 | Heimbuch | |
| 6,247,417 B1 | * 6/2001 | Heimbuch | 211/211 |

OTHER PUBLICATIONS

Deere & Company brochure entitled "Fundamentals of machine Operation—Planting", FMO–12102B, pp. 18–37 including front and back covers, printed in the U.S.A., 1981.

European Abstract of a Kleine Seed Meter, EP018220.

3 Pictures of a Kleine Seed Meter.

* cited by examiner

*Primary Examiner*—Lesley D. Morris
*Assistant Examiner*—Dinh Q. Nguyen

(57) ABSTRACT

A seed meter and accelerator comprises a stationary housing, a stationary axially extending dispensing rim, a radially extending flange and a rotating disc. The stationary housing is provided with an axially extending metering rim. The meter rim is provided with a metering gap. The stationary axially extending dispensing rim is located radially outward from the metering rim and is provided with a dispensing gap. The radially extending flange extends between the axially extending metering rim and the axially extending dispensing rim. The rotating disc is provided with an inner portion having circumferentially arranged seed pockets and an outer portion having seed dispensing openings. Each seed pocket corresponds to a seed dispensing opening. Passages extend between the seed pockets and the seed dispensing openings. The seed pockets of the inner portion are located adjacent to and radially inward from the metering rim. The seed dispensing openings are located adjacent to and radially inward from the dispensing rim. A source of air pressure pressurizes the stationary housing driving seeds into the seed pockets. When a seed pocket is registered with the metering gap the air pressure and centrifugal force drive the seed outwardly through the passage to the seed dispensing opening. At the opening the seed is held in place by the air pressure and the centrifugal force of the rotating disc until it reaches the seed dispensing gap. As the seed is released from the seed dispensing gap it proceeds into the seed furrow.

14 Claims, 5 Drawing Sheets

SEED METER AND ACCELERATOR

BACKGROUND OF THE INVENTION

1. Field of the Invention

The invention is directed to a seed meter and accelerator permitting increased planting speeds and improved seed spacing.

2. Description of the Prior Art

Row crop planters can accurately meter and place seed in a seed trench. Typical row crop planters are not operated at planting speeds exceeding six miles per hour. At faster speeds the seed is not evenly spaced in the seed trench. Part of this spacing problem can be traced to the seed tube into which metered seed is deposited and through which it falls to the seed trench. As the seed falls through the seed tube it bounces back and forth in the seed tube. This is especially true at faster planting speeds. Seed tubes are curved rearwardly imparting a rearward thrust to the seed to counteract the forward speed of the planter. Seed tubes are designed to accommodate a selected range of planting speeds, the tubes cannot be adjusted to faster planting speeds.

The Kliene seed meter is an attempt to overcome these problems by accelerating the seed after it has been metered and directly depositing the seed in the seed trench from the accelerator.

SUMMARY

A seed meter and accelerator comprises a stationary housing, a stationary axially extending dispensing rim, a radially extending flange and a rotating disc. The stationary housing is provided with an axially extending metering rim. The metering rim is provided with a metering gap. The stationary axially extending dispensing rim is located radially outward from the metering rim and is provided with a dispensing gap. The radially extending flange extends between the axially extending metering rim and the axially extending dispensing rim. In the illustrated embodiment the radially extending flange is integral with the stationary housing and the stationary dispensing rim, however this flange could also be made integral with the rotating disc. The rotating disc is provided with an inner portion having circumferentially arranged seed pockets and an outer portion having seed dispensing openings. Each seed pocket corresponds to a seed dispensing opening. Passages extend between the seed pockets and the seed dispensing openings. The seed pockets of the inner portion are located adjacent to and radially inward from the metering rim. The metering rim prevents the radially outward release of seed from the seed pockets until a seed pocket is registered with the metering gap. The seed dispensing openings are located adjacent to and radially inward from the dispensing rim, so that the dispensing rim prevents the radially outward release of seed from the seed dispensing openings. A source of air pressure pressurizes the stationary housing driving seeds into the seed pockets. When a seed pocket is registered with the metering gap the air pressure and centrifugal force drive the seed outwardly through the passage to the seed dispensing opening. At the opening the seed is held in place by the air pressure and the centrifugal force of the rotating disc, until it reaches the seed dispensing gap. As the seed is released from the seed dispensing gap it proceeds into the seed trench.

DETAILED DESCRIPTION

Figure 1:
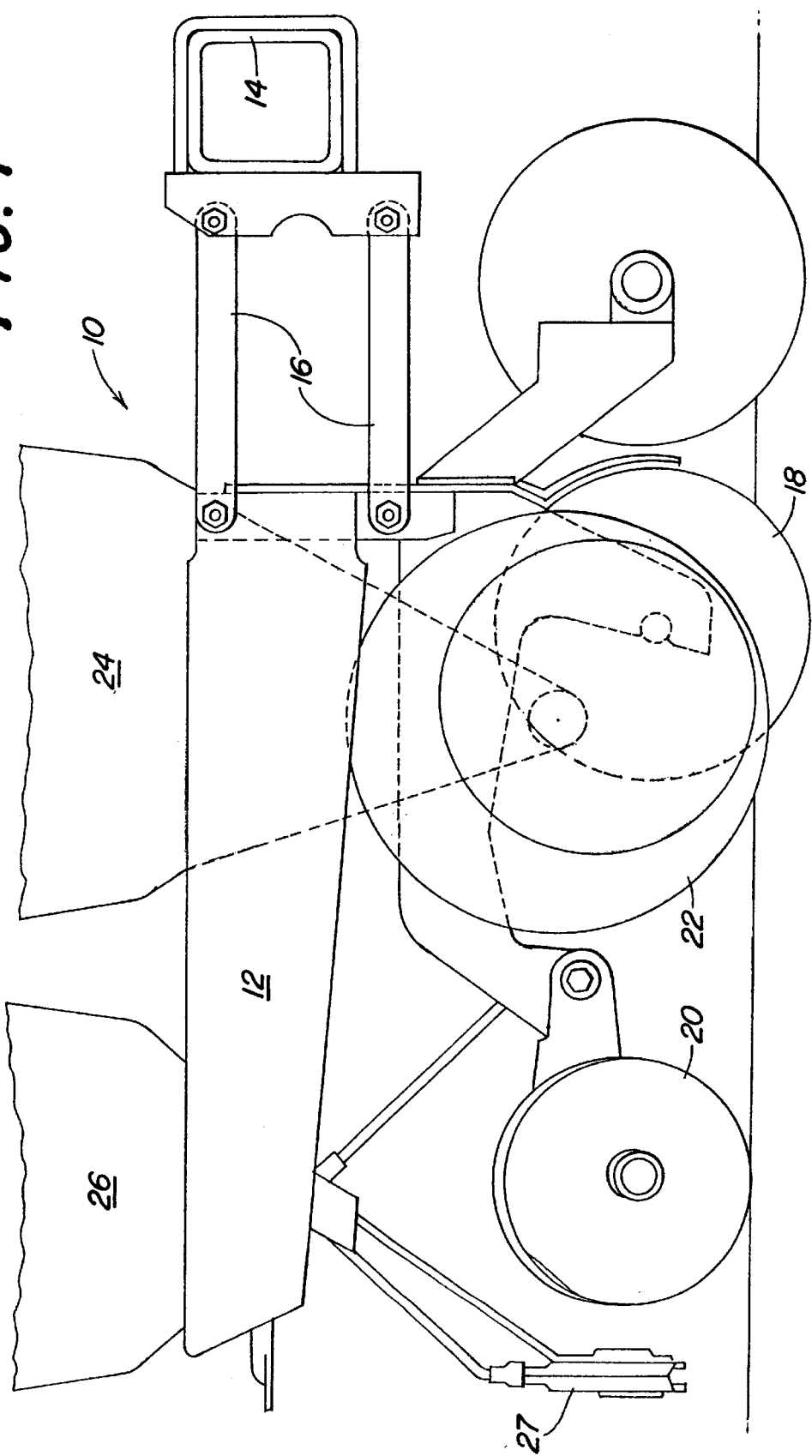
FIG. 1 is a side view of a row crop planting unit.
Figure 2:
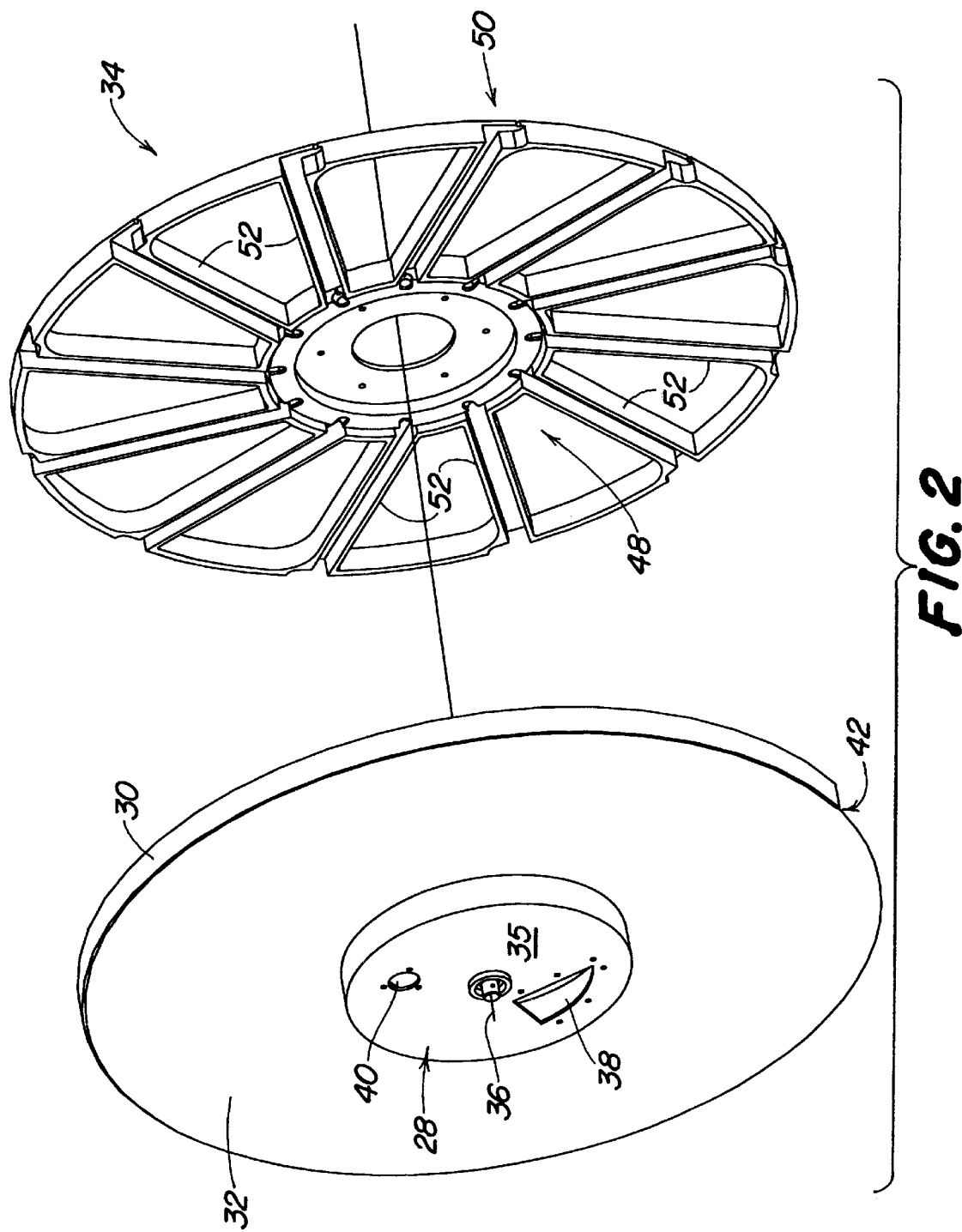
FIG. 2 is an exploded perspective view of the seed meter.
Figure 3:
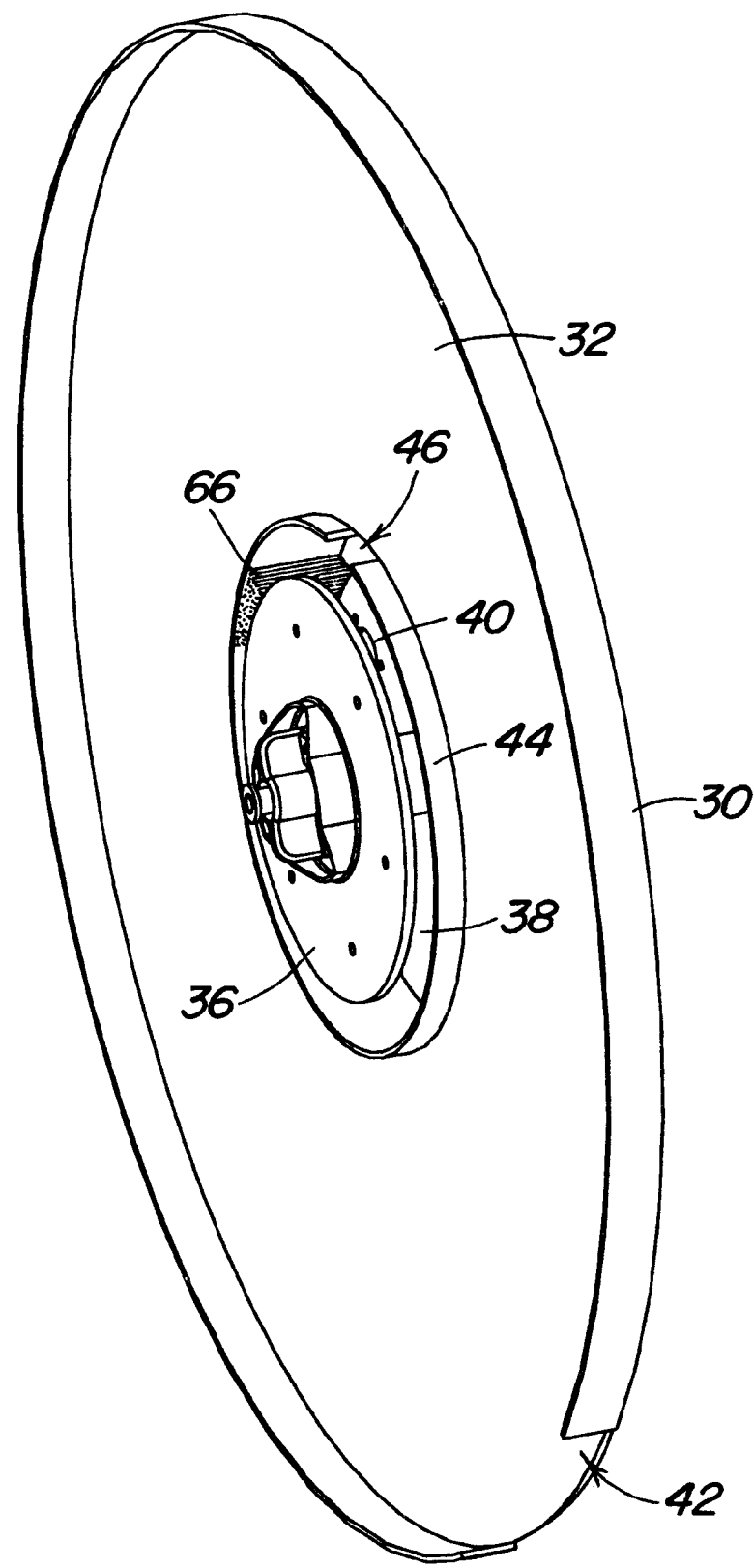
FIG. 3 is a perspective view of the stationary housing, the radially extending flange and the axially extending dispensing rim.
Figure 4:
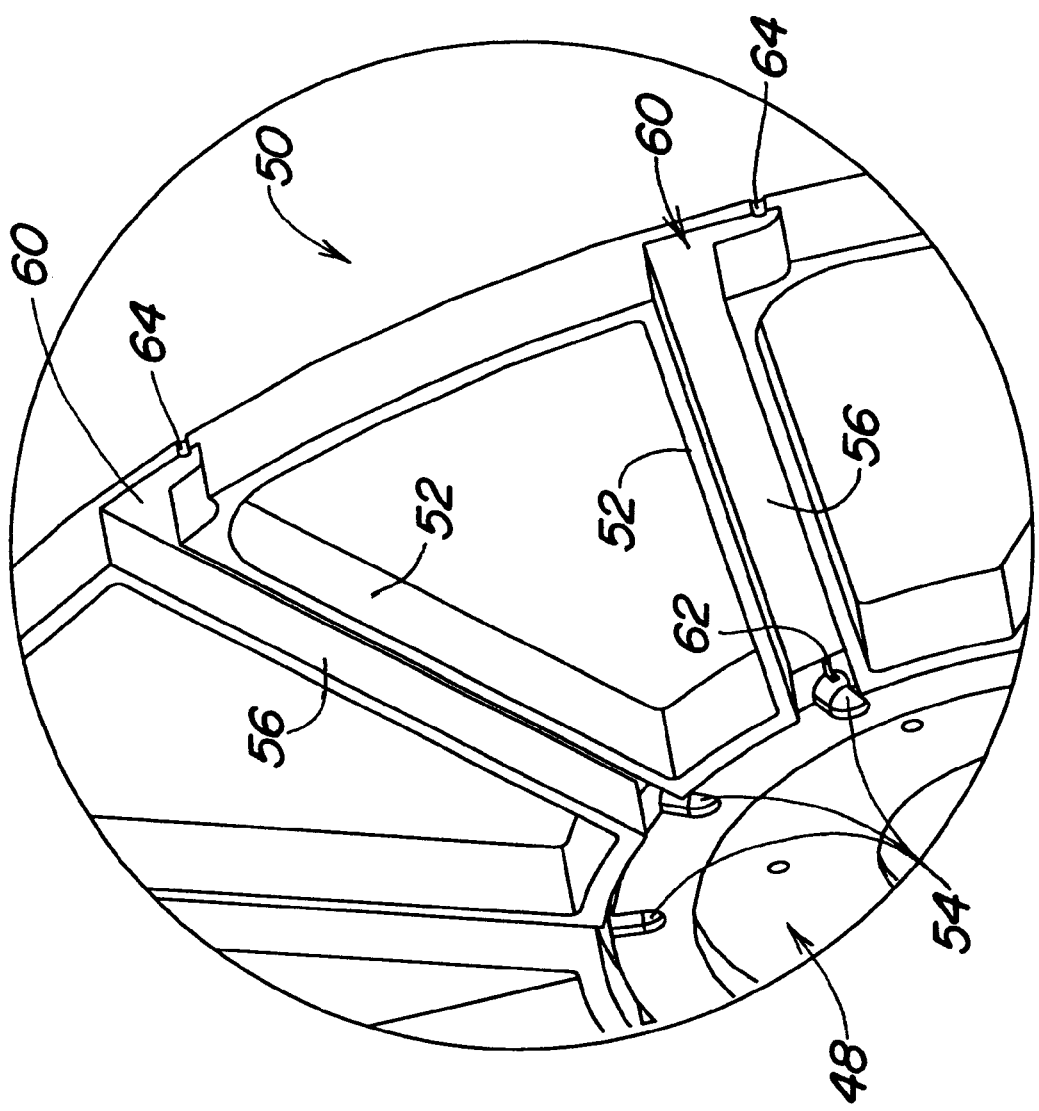
FIG. 4 is a partial enlarged perspective view of the rotating disc.
Figure 5:
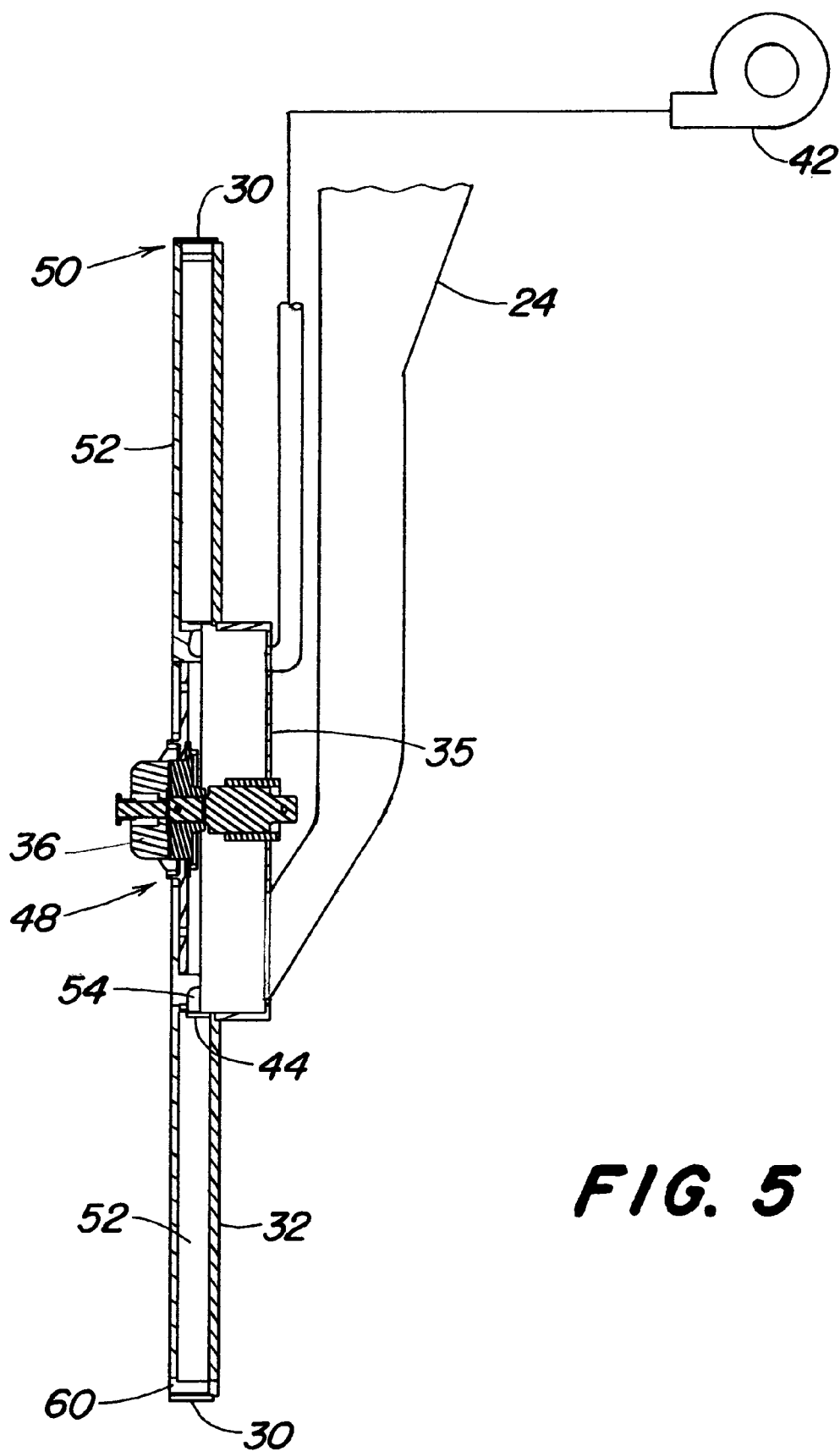
FIG. 5 is a cross sectional and schematic view of the seed meter.

FIG. 1 illustrates a row crop planting unit 10 having a frame 12 that is attached to a toolbar 14 by parallel linkage 16. The frame 12 is provided with a furrow opener 18 for forming a seed trench and closing wheels 20 for closing the seed trench formed by the furrow opener 18. A seed meter and accelerator 22 is located above and behind the furrow opener 18. The seed meter and accelerator 22 dispenses and accelerates a measured amount of seed into the seed trench. Seed hopper 24 is located above the seed meter 22 and provides a reservoir of seed to be fed into the seed meter. The planting unit 10 may be provided with a chemical hopper 26 for feeding a dispenser 27 for applying chemicals during a planting operation. Although the present invention is described as being used on a row crop planter it may also be used on other seeding machines such as grain drills.

The seed meter and accelerator 22 comprises a stationary housing 28, a stationary axially extending dispensing rim 30, a radially extending flange 32 and a circular rotating disc 34. The stationary housing 28 is provided with a circular wall 35 having a seed aperture 38 and an air aperture 40. The seed aperture receives seed from the seed hopper 24 and allows seed to pass through the stationary housing 28 to the rotating disc 34. The air aperture 40 is coupled to a source of air pressure in the form of a fan 43 for transmitting air pressure into the interior of the stationary housing 28. A central hub 36 is rotatively mounted in circular wall 35 and extends through the stationary housing 28 where it is coupled to the rotating disc 34. The stationary housing 28 is also provided with a cylindrical axially extending metering rim 44. The metering rim 44 is provided with a seed metering gap 46.

The stationary axially extending dispensing rim 30 is located radially outward from the stationary housing 28. The dispensing rim 30 is provided with a seed dispensing gap 42. Although in the illustrated embodiment the dispensing rim 30 extends circumferentially around the stationary housing 28 only a portion of the dispensing rim 30 is needed. More specifically, the dispensing rim 30 only needs to extend circumferentially from the metering gap 46 clockwise to the release point for the seed, near the bottom of the seed meter and accelerator 22. In the illustrated embodiment the metering rim 44 and the dispensing rim 30 have an upper half and a lower half. The seed metering gap 46 is located in the upper half of the metering rim 44 and the seed dispensing gap 42 is located in the lower half of the dispensing rim 30.

In the illustrated embodiment the radially extending flange 32 is integrally mounted to the stationary housing 28 and the dispensing rim 30. However the radially extending flange 32 could also be made integral with the rotating disc 34.

The rotating disc 34 is coupled to the central hub 36 for rotation therewith. The rotating disc 34 has an inner portion 48 and an outer portion 50 that is coupled to the inner portion 48 by a series of spokes 52. The inner portion 48 is provided with a series of circumferentially arranged seed pockets 54 for receiving individual seeds from the seed hopper 24 through seed aperture 38 located in the stationary housing 28. The seed pockets 54 are located adjacent to and radially inward from the metering rim 44. The metering rim 44 prevents individual seeds located in the seed pockets 54 from being released radially outward except when the seed pocket 54 is registered with the seed metering gap 46. Seed released by the seed metering gap 46 proceeds outwardly from the inner portion 48 through a passage 56. The passages 56 are formed by grooves 58 formed in spokes 52 and enclosed by the radially extending flange 32. Each passage 56 terminates in a seed dispensing opening 60. The seed dispensing openings 60 are adjacent to and-radially inward from the dispensing rim 30. The dispensing rim 30 prevents the radially outward release of seed from the seed dispensing opening 60. When the seed dispensing opening 60 is registered with the seed dispensing gap 42 the seed is released to the seed trench.

The seed is driven into the seed pockets 54 and through the passages 56 by a source of air pressure. In the illustrated embodiment, the source of air pressure is a fan 43. The positive air pressure from the fan 43 is directed into the seed meter through an air aperture 40. This positive air pressure from the fan 43 pressurizes the seed meter. Each of the seed pockets 54 is provided with an air leakage path in the form of a notch 62 so that the flow of air through this notch attracts individual seed to the individual seed pocket 56. Similarly each of the seed dispensing openings 60 is also provided with an air leakage path in the form of a notch 64 for maintaining seed in the individual openings. In addition, the flow of air up the passages 56 forces the seed radially outwardly from the stationary housing 28. The rotation of the seed meter and accelerator assembly also contributes a centrifugal component to this outward movement of the seed in the passages.

The illustrated embodiment of the present invention uses a positive air pressure differential from a fan 43 to push the seeds into the seed pockets 54. A negative air pressure differential in the form of a vacuum could also be used to pull the seeds into the pockets 54 and through the passages 56. An air pressure differential, either positive or negative, may not be needed and centrifugal force alone can be used to drive the seeds into the seed pockets 54 and through the passages 56.

The stationary housing 28 is provided with a singulator 66 for eliminating double seeds from the seed pockets 54. In the illustrated embodiment the singulator is a brush, however other singulators can be used such as combs and flippers.

The present invention should not be limited by the above-described embodiment, but should be limited solely by the claims that follow.

We claim:

1. A seed meter and accelerator for metering and accelerating seed on a seeding machine, the seed meter and accelerator comprising:

a stationary housing having an axially extending metering rim, the axially extending metering rim is provided with a metering gap;

a stationary axially extending dispensing rim being located radially outward from the stationary housing, the axially extending dispensing rim having a dispensing gap;

a rotating disc located adjacent to the stationary housing, the rotating disc having an inner portion and an outer portion, the inner portion having seed pockets for receiving individual seeds, the seed pockets of the inner portion being located adjacent to and radially inward from the metering rim so that the metering rim prevents the radially outward release of seed from the seed pockets, the metering gap allowing the radially outward release of seed from the seed pockets, the outer portion of the rotating disc having seed dispensing openings for releasing seed from said seed meter and accelerator, the seed dispensing openings being located adjacent to and radially inward from the dispensing rim so that the dispensing rim prevents the radially outward release of seed from the seed dispensing openings, the seed dispensing gap allowing the radially outward release of seed from the seed dispensing openings, each seed pocket is coupled to one of the seed dispensing openings by a passage extending from the seed pocket to the seed dispensing opening;

a positive source of air pressure for driving the seed to the seed pockets and outwardly through the passage to the seed dispensing opening.

2. A seed meter and accelerator as defined by claim 1 wherein the stationary housing has a seed aperture through which seed is directed to the inner portion of the rotating disc.

3. A seed meter and accelerator as defined by claim 2 wherein each seed pocket is provided with an air leakage path.

4. A seed meter and accelerator as defined by claim 3 wherein each seed dispensing opening is provided with an air leakage path.

5. A seed meter and accelerator as defined by claim 4 wherein a radially extending flange extends between the stationary housing and the stationary axially extending seed dispensing rim.

6. A seed meter and accelerator as defined by claim 5 wherein each passage is formed by a groove in the rotating disc and the radially extending flange of the stationary disc.

7. A seed meter and accelerator as defined by claim 6 wherein the rotating disc is provided with spokes extending from the inner portion to the outer portion, the spokes corresponding to the passages.

8. A seed meter and accelerator as defined by claim 4 wherein both the metering rim and the dispensing rim have an upper half and a lower half, the seed metering gap being located in the upper half of the metering rim and the seed dispensing gap being located in the lower half of the dispensing rim.

9. A seed meter and accelerator as defined by claim 8 wherein the seed metered through the seed metering gap is released upwardly and forwardly and the seed dispensed through the seed dispensing gap is dispensed downwardly and rearwardly.

10. A seed meter and accelerator as defined by claim 4 wherein the stationary housing is provided with an air aperture for receiving air pressure from the source of air pressure.

11. A seed meter and accelerator for metering and accelerating seed on a seeding machine, the seed meter and accelerator comprising:

an axially extending metering rim having a metering gap;

a stationary axially extending dispensing rim being located radially outward from the axially extending metering rim, the axially extending dispensing rim having a dispensing gap;

a rotating disc located adjacent to the axially extending metering rim and the axially extending dispensing rim, the rotating disc having an inner portion and an outer portion, the inner portion having seed pockets for receiving individual seeds, the seed pockets of the inner portion being located adjacent to and radially inward from the metering rim so that the metering rim prevents the radially outward release of seed from the seed pockets, the metering gap allowing the radially outward release of seed from the seed pockets, the outer portion of the rotating disc having seed dispensing openings for releasing seed from said seed meter and accelerator, the seed dispensing openings being located adjacent to and radially inward from the dispensing rim so that the dispensing rim prevents the radially outward release of seed from the seed dispensing openings, the seed dispensing gap allowing the radially outward release of seed from the seed dispensing openings, each seed pocket is coupled to one of the seed dispensing openings by a passage extending from the seed pocket to the seed dispensing opening;

a positive source of air pressure for driving the seed to the seed pockets and outwardly through the passage to the seed dispensing opening.

12. A seed meter and accelerator as defined by claim 11 wherein each seed pocket is provided with an air leakage path.

13. A seed meter and accelerator as defined by claim 12 wherein each seed dispensing opening is provided with an air leakage path.

14. A method of metering and accelerating seed comprising the following steps:

rotating a rotating disc;

driving seed into seed pockets on the rotating disc by positive air pressure;

holding seed into the seed pockets by a stationary metering rim by positive air pressure;

metering seed by allowing the seed in the seed pockets to pass through a metering gap in the metering rim;

transporting seed through passages extending radially outward from the seed pockets to seed dispensing openings by positive air pressure;

holding the seed in the seed dispensing openings by a seed dispensing rim;

dispensing seed into a seed trench by allowing seed in the seed dispensing openings to pass through a seed dispensing gap in the seed dispensing rim.

* * * * *